(12) United States Patent
Maekawa et al.

(10) Patent No.: US 6,451,901 B1
(45) Date of Patent: Sep. 17, 2002

(54) AQUEOUS DISPERSION AND PROCESS FOR PRODUCING THE SAME

(75) Inventors: Kazuhiko Maekawa; Naohiko Uchiumi; Mamoru Omoda; Atsushi Itou, all of Kurashiki (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/787,424

(22) PCT Filed: Jul. 14, 2000

(86) PCT No.: PCT/JP00/04731

§ 371 (c)(1),
(2), (4) Date: Mar. 23, 2001

(87) PCT Pub. No.: WO01/07518

PCT Pub. Date: Feb. 1, 2001

(30) Foreign Application Priority Data

Jul. 23, 1999 (JP) ............................................. 11-208705

(51) Int. Cl.$^7$ .......................... C08L 53/00; C08L 31/02; C08J 3/05
(52) U.S. Cl. ........................ 524/505; 524/832; 523/205; 523/206; 523/335
(58) Field of Search ................................. 523/205, 206, 523/335; 524/505, 832

(56) References Cited

U.S. PATENT DOCUMENTS

| | | | |
|---|---|---|---|
| 5,139,805 A | * | 8/1992 | Tada et al. |
| 5,789,123 A | * | 8/1998 | Cleckner et al. |
| 6,096,435 A | * | 8/2000 | Maekawa et al. |
| 6,146,704 A | * | 11/2000 | Brodt et al. |

FOREIGN PATENT DOCUMENTS

| | | |
|---|---|---|
| EP | 0 556 649 | 8/1993 |
| JP | 10-176113 | 6/1998 |
| JP | 2000-34388 | 2/2000 |

* cited by examiner

Primary Examiner—Tae H. Yoon
(74) Attorney, Agent, or Firm—Oblon, Spivak, McClelland, Maier & Neustadt, P.C.

(57) ABSTRACT

The invention is to provide an aqueous dispersion having good adhesiveness, especially airtight adhesiveness to various substrates, and having good storage stability, good weather resistance and good hydrophobicity. The aqueous dispersion comprises a block copolymer composed of polymer blocks (A) consisting essentially of olefin monomer units and polymer blocks (B) comprising from 2 to 100 mol % of units of vinyl monomers having a carboxyl group or a carboxylic acid anhydride group and from 0 to 98 mol % of units of other vinyl comonomers capable of copolymerizing with the vinyl monomers, dispersed in an aqueous solution of at least 0.05 equivalents, relative to the carboxyl group or the carboxylic acid anhydride group, of a basic substance.

21 Claims, No Drawings

AQUEOUS DISPERSION AND PROCESS FOR PRODUCING THE SAME

TECHNICAL FIELD

The present invention relates to an aqueous dispersion and to a method for producing it. The aqueous dispersion of the invention has good adhesiveness, especially airtight adhesiveness to various substrates, and has good storage stability, good weather resistance and good hydrophobicity.

BACKGROUND ART

Polyolefin resins such as polypropylene have good resin properties including workability, water resistance and oil resistance, and are inexpensive. Therefore, they are much used for plastics for electric and electronic appliances for household use and for automobile parts. To add further value thereto, polyolefin moldings are coated with paint or are formed into laminates with other resins. As having low polarity, however, polyolefins are problematic in that they are poorly adhesive to ordinary paint and to other resins.

To solve the problem, pre-treating the surface of polyolefin moldings with chromic acid, flame, corona discharge, plasma, solvent, etc. to thereby increase the polarity of the surface of the moldings and to improve the adhesiveness thereof to paint and to other resins has heretofore been tried. However, the treatment requires complicated working steps and requires a large amount of corrosive chemicals, and is therefore often dangerous.

Given that situation, a method of undercoating the surface of polyolefin moldings with a primer that comprises, as the essential ingredient, a chloropolyolefin has been proposed. When used, however, the chloropolyolefin is dissolved in an aromatic organic solvent such as toluene, xylene or the like harmful to human bodies, and using it is therefore undesirable from the viewpoint of environmental safety. A method of dispersing such a chloropolyolefin in water has been proposed (see Japanese Patent Laid-Open No. 256556/1989). Even in this method, however, it is still difficult to prepare the aqueous dispersion without using such an aromatic organic solvent at all, and, in addition, the weather resistance of the coating film formed is poor.

Use of an aqueous dispersion of a modified polyolefin for primer has been proposed (see Japanese Patent Laid-Open No. 73250/1994). However, since the modified polyolefin is a graft copolymer, the aqueous dispersion comprising it must contain a large amount of surfactant to ensure its stability, but the adhesiveness of the coating film formed is thereby lowered. In addition, when an inorganic filler having been subjected to surface treatment with the aqueous dispersion of a modified polyolefin is added to a polyolefin, it detracts from the mechanical properties of the polyolefin since the adhesiveness between the polyolefin and the inorganic filler is poor.

Accordingly, the object of the present invention is to provide an aqueous dispersion having good adhesiveness, especially airtight adhesiveness to various substrates, and having good storage stability, good weather resistance and good hydrophobicity, and to provide a method for producing it.

DISCLOSURE OF THE INVENTION

According to the invention, the above-mentioned object can be attained by providing an aqueous dispersion of a block copolymer composed of polymer blocks (A) consisting essentially of olefin monomer units and polymer blocks (B) comprising from 2 to 100 mol % of units of vinyl monomers having a carboxyl group or a carboxylic acid anhydride group and from 0 to 98 mol % of units of other vinyl comonomers capable of copolymerizing with the vinyl monomers, dispersed in an aqueous solution of at least 0.05 equivalents, relative to the carboxyl group or the carboxylic acid anhydride group, of a basic substance; and a method for producing the aqueous dispersion by dispersing a block copolymer composed of polymer blocks (A) Consisting essentially of olefin monomer units and polymer blocks (B) comprising from 2 to 100 mol % of units of vinyl monomers having a carboxyl group or a carboxylic acid anhydride group and from 0 to 98 mol % of units of other vinyl comonomers capable of copolymerizing with the vinyl monomers, in an aqueous solution of at least 0.05 equivalents, relative to the carboxyl group or the carboxylic acid anhydride group, of a basic substance, at a temperature not lower than the melting point of the block copolymer.

BEST MODES OF CARRYING OUT THE INVENTION

The block copolymer in the invention is composed of polymer blocks (A) and polymer blocks (B) mentioned below, and it includes, for example, AB-type diblock copolymer, ABA-type triblock copolymer, BAB-type triblock copolymer, etc. Of those, preferred is the AB-type diblock copolymer.

The polymer blocks (A) that constitute the block copolymer consist essentially of olefin monomer units. The olefin monomer unit content of the polymer blocks (A) preferably falls between 50 and 100 mol %, more preferably between 70 and 100 mol %, even more preferably between 80 and 100 mol %, based on the number of mols of all the constituent units of the polymer blocks (A).

The olefin monomer units include, for example, those derived from ethylene; α-olefins such as propylene, 1-butene, 2-methyl-1-butene, 3-methyl-1-butene, 1-pentene, 4-methyl-1-pentene, 1-hexene, 1-octene, 1-decene, 1-octadecene, etc.; 2-butene; isobutylene; conjugated dienes such as butadiene, isoprene, etc.; cyclopentadiene, vinylcyclohexane, β-pinene, etc. The polymer block (A) may contain one or more of these units. Preferably, the polymer block (A) contains units derived from ethylene or propylene. More preferably, it contains units derived from propylene, or contains units derived from propylene and units derived from other α-olefins than propylene. In case where the olefin monomer units are derived from conjugated dienes such as butadiene, isoprene, cyclopentadiene, etc., the remaining unsaturated bonds may be hydrogenated.

The polymer block (A) may optionally contain from 0 to 50 mol % of units derived from vinyl comonomers capable of copolymerizing with the olefin monomers. The comonomer content of the polymer block (A) preferably falls between 0 and 30 mol %, more preferably between 0 and 20 mol %.

The vinyl comonomers capable of copolymerizing with the olefin monomers include, for example, (meth)acrylonitrile; vinyl esters such as vinyl acetate, vinyl pivalate, etc.; (meth)acrylates such as methyl (meth)acrylate, ethyl (meth)acrylate, butyl (meth)acrylate, dodecyl (meth)acrylate, 2-ethylhexyl (meth)acrylate, etc.; (meth)acrylamide, N-vinyl-2-pyrrolidone, etc. One or more of these comonomers may be copolymerized with the olefin monomers. Of those, preferred are methyl acrylate, ethyl acrylate, and vinyl acetate. The polymer blocks (A) may be modified. The modification may be effected in various known methods of halogenation such as chlorination or bromination, or chlorosulfonation, epoxidation, hydroxylation, acid anhydride-carboxylation, acid-carboxylation, etc.

The polymer blocks (B) that constitute the block copolymer in the invention contain from 2 to 100 mol %, based on the number of mols of all the constituent units of the polymer blocks (B), vinyl monomer units having a carboxyl group or a carboxylic acid anhydride group. Preferably, the vinyl monomer unit content of the polymer blocks (B) falls between 2 and 50 mol %, more preferably between 2 and 30 mol %.

The carboxyl group-having vinyl monomers include, for example, acrylic acid, methacrylic acid, crotonic acid, cinnamic acid, itaconic acid, maleic acid etc. The polymer block (B) may contain one or more of these monomer units. Of those, preferred are acrylic acid and methacrylic acid.

The vinyl monomers having a carboxylic acid anhydride group (represented by —CO—O—CO—) include, for example, maleic anhydride, itaconic anhydride, citraconic anhydride, butenylsuccinic anhydride, tetrahydrophthalic anhydride, etc. The polymer block (B) may contain one or more of these monomer units. Of those, preferred is maleic anhydride.

The polymer blocks (B) may contain from 0 to 98 mol %, preferably from 50 to 98 mol %, more preferably from 70 to 98 mol %, based on the number of mols of all the constituent units of the polymer blocks (B), units of other vinyl comonomers capable of copolymerizing with the vinyl monomers having a carboxyl group or a carboxylic acid anhydride group. The vinyl comonomers include, for example, styrene monomers such as styrene, p-styrenesulfonic acid and its sodium salt, potassium salt, etc.; (meth)acrylonitrile; vinyl esters such as vinyl acetate, vinyl pivalate, etc.; (meth) acrylates such as methyl (meth)acrylate, ethyl (meth) acrylate, butyl (meth)acrylate, dodecyl (meth)acrylate, 2-ethylhexyl (meth)acrylate, etc.; (meth)acrylamide, N-vinyl-2-pyrrolidone, etc. One or more of these comonomers may be copolymerized with the vinyl monomers. Of those, preferred as methyl (meth)acrylate, ethyl (meth) acrylate, styrene, and vinyl acetate. In the invention, the polymer blocks (B) may be chlorinated. The chlorination may be effected in any known method of radical addition. If desired, the polymer blocks (B) may be chlorinated along with the polymer blocks (A) after the block copolymer mentioned below has been produced.

Preferably, the number-average molecular weight of the polymer blocks (A) falls between 1,000 and 100,000, more preferably between 2,500 and 50,000. Also preferably, the number-average molecular weight of the polymer blocks (B) falls between 1,000 and 100,000, more preferably between 2,500 and 50,000. Also preferably, the number-average molecular weight of the block copolymer falls between 2,000 and 200,000, more preferably between 5,000 and 100,000. The number-average molecular weight of polymer referred to herein is obtained through gel permeation chromatography (GPC), based on the standard polystyrene calibration curve.

The block copolymer in the invention can be produced, for example, by radical-polymerizing the monomer component to constitute the polymer blocks (B), in the presence of the polymer blocks (A) having a mercapto group at the terminal. According to the method, the block copolymer having an intended number-average molecular weight and an intended molecular weight distribution can be produced in a simple and efficient manner. The polymer blocks (A) having a mercapto group at the terminal can be produced in various methods. For example, it can be produced in a method of adding thio-S-acetic acid, thio-S-benzoic acid, thio-S-propionic acid, thio-S-butyric acid, thio-S-valeric acid or the like to a polyolefin polymer having a double bond at the terminal, followed by processing the resulting polymer adduct with acid or alkali; or in a method of using ethylene sulfide as a terminator in producing polyolefin through anion polymerization.

Containing 100 parts by weight of the block copolymer mentioned above along with from 1 to 200 parts by weight of an olefin polymer, the aqueous dispersion of the invention can form a film of high strength. Preferably, the proportion of the olefin polymer in the aqueous dispersion falls between 10 and 100 parts by weight, relative to 100 parts by weight of the block copolymer therein, more preferably between 10 and 50 parts by weight, in view of the balance of the storage stability of the aqueous dispersion and the strength of the film. If the proportion of the olefin polymer therein is larger than 200 parts by weight, the mean particle size of the matters dispersed in the aqueous dispersion will be large, and the storage stability of the aqueous dispersion will be poor.

The olefin polymer includes, for example, low-density polyethylene, middle-density polyethylene, high-density polyethylene, very-low-density polyethylene, linear low-density polyethylene, polypropylene, ethylene-vinyl acetate copolymers, ethylene-ethyl acrylate copolymers, ethylene-methyl acrylate copolymers, ethylene-α-olefin copolymers, ethylene-propylene-diene (or triene) ter-copolymers, etc. The aqueous dispersion may contain one or more of these olefin polymers. α-olefins in the ethylene-α-olefin copolymers include propylene, 1-butene, 1-pentene, 1-hexene, 4-methyl-1-pentene, 1-octene, 1-decene, etc. Dienes (or trienes) in the ethylene-propylene-diene (or triene) ter-copolymers include linear non-conjugated dienes such as 1,4-hexadiene, 1,6-octadiene, 2-methyl-1,5-hexadiene, 6-methyl-1,6-heptadiene, 7-methyl-1,6-octadiene, etc.; cyclic non-conjugated dienes such as cyclohexadiene, dichloropentadiene, methyltetrahydroindene, 5-vinylnorbornene, 5-ethylidene-2-norbornene, 5-methylene-2-norbornene, 5-isopropylidene-2-norbornene, 6-chloromethyl-5-isopropenyl-2-norbornene, etc.; trienes such as 2,3-diisopropylidene-5-norbornene, 2-ethylidene-3-isopropylidene-5-norbornene, 2-propenyl-2,2-norbornadiene, 1,3,7-octatriene, 1,4,9-decatriene, etc. The olefin polymers may be modified. The modification may be effected in various known methods of halogenation such as chlorination or bromination, or chlorosul fonation, epoxidation, hydroxylation, acid anhydride-carboxylation, acid-carboxylation, etc.

The aqueous dispersion of the invention can be produced by dispersing the block copolymer optionally along with an olefin polymer, in an aqueous solution of at least 0.05 equivalents, relative to the carboxyl group or the carboxylic acid anhydride group in the polymer blocks (B) of the block copolymer, of a basic substance, at a temperature not lower than the melting point of the block copolymer. In case where the aqueous dispersion containing the olefin polymer is produced, the block copolymer and the olefin polymer are dispersed in the aqueous dispersion at a temperature not lower than the melting point of either one of the two having a higher melting point. If they are dispersed in the aqueous solution at a temperature lower than the indicated melting point, the mean particle size of the matters dispersed is large and the stability of the aqueous dispersion is low.

Preferably, the mean particle size of the matters dispersed in the aqueous dispersion of the invention falls between 0.05 and 2 μm, more preferably between 0.05 and 1 μm, in view of the storage stability of the aqueous dispersion and of the adhesiveness, especially airtight adhesiveness thereof to various substrates.

Dispersing the matters may be effected in a pressure container equipped with a stirring unit. The stirring unit is not specifically defined, but preferred are turbine stirrers, colloid mills, homomixers and homogenizers as producing large shear force.

The basic substance includes amine compounds such as ammonia, hydroxylamine, ammonium hydroxide, hydrazine, hydrazine hydrate, (di)methylamine, (di)ethylamine, (di)propylamine, (di)butylamine, (di)hexylamine, (di)octylamine, (di)ethanolamine, (di)propanolamine, N-methyldiethanolamine, triethylamine, N,N-dimethylethanolamine, 2-dimethylamino-2-methyl-1-propanol, 2-amino-2-methyl-1-propanol, cyclohexylamine, tetramethylammonium hydroxide, etc.; metal oxides such as sodium oxide, sodium peroxide, potassium oxide, potassium peroxide, calcium oxide, strontium oxide, barium oxide, etc.; metal hydroxides such as barium hydroxide, sodium hydroxide, potassium hydroxide, calcium hydroxide, strontium hydroxide, etc.; metal hydrides such as sodium hydride, potassium hydride, calcium hydride, etc.; carbonates such as sodium carbonate, potassium carbonate, sodium hydrogencarbonate, potassium hydrogencarbonate, calcium hydrogencarbonate, etc.; acetates such as sodium acetate, potassium acetate, calcium acetate, etc. Of those, preferred are ammonia, (di)methylamine, (di)ethylamine, (di)propylamine, N-methyldiethanolamine, triethylamine, N,N-dimethylethanolamine, 2-dimethylamino-2-methyl-1-propanol, 2-amino-2-methyl-1-propanol, (di)butylamine, sodium hydroxide and potassium hydroxide, in view of their easy availability and of the stability of the aqueous dispersion; and more preferred are ammonia, N,N-dimethylethanolamine, sodium hydroxide and potassium hydroxide.

These basic substances are used in the form of their aqueous solutions. The amount of the basic substance to be used is at least 0.05 equivalents relative to the carboxyl group or the carboxylic acid anhydride group in the polymer blocks (B) of the block copolymer, but preferably from 0.2 to 5.0 equivalents, more preferably from 0.3 to 1.5 equivalents for further reducing the particle size of the matters dispersed.

Preferably, the blend ratio of the block copolymer to the aqueous solution of the basic substance to form the aqueous dispersion of the invention is such that the amount of the block copolymer falls between 5 and 70 parts by weight while that of the aqueous solution of the basic substance falls between 95 and 30 parts by weight. In the aqueous dispersion of the invention, at least 5 mol % of the carboxyl group or the carboxylic acid anhydride group in the polymer blocks (B) of the block copolymer is neutralized with the basic substance to form a salt.

If desired, the aqueous dispersion of the invention may contain a viscosity improver, a defoaming agent, etc. For improving the wettability of the substrates to which the aqueous dispersion is applied, a small amount of an organic solvent may be added to the aqueous dispersion. In addition to the compounds mentioned above, the aqueous dispersion of the invention may further contain various stabilizers such as antioxidant, weather-proofing stabilizer, thermal degradation inhibitor, etc.; colorants such as titanium oxide, organic pigment, etc.; electroconductive agents such as carbon black, ferrite, etc. Also if desired, the aqueous dispersion of the invention may contain a curing agent selected from, for example, epoxy compounds, aziridine compounds, oxazoline compounds, carbodiimide compounds, etc.

Treating the surface of organic or inorganic particles with the aqueous dispersion of the invention gives particles having absorbed a salt of a block copolymer composed of polymer blocks (A) consisting Essentially of olefin monomer units and polymer blocks (B) comprising from 2 to 100 mol % of units of vinyl monomers having a carboxyl group or a carboxylic acid anhydride group and from 0 to 98 mol % of units of other vinyl comonomers capable of copolymerizing with the vinyl monomers, or having adsorbed a polymer composition comprising 100 parts by weight of the salt and from 1 to 200 parts by weight of an olefin polymer. The particles will be hereinafter referred to as composite particles. Of the composite particles, the nucleating particles may be entirely or partially covered with the salt of the block copolymer or with the polymer composition. In the salt of the block copolymer, at least 5 mol % of the carboxyl group is neutralized with a basic substance. Preferably, at least 20 mol %, more preferably at least 30 mol % of the carboxyl group is neutralized. The size of the composite particles and that of the nucleating particles may be suitably defined, depending on the use of the composite particles. Preferably, the major diameter of the particles falls between 0.01 μm and 50 mm, more preferably between 0.05 and 100 μm.

The treatment may be effected, for example, according to a method of adding the aqueous dispersion of the invention to nucleating particles followed by stirring them; or a method of mixing and stirring nucleating particles in water to form an suspension of the particles, followed by adding the aqueous dispersion of the invention to the aqueous suspension with stirring, and uniformly dispersing them; or a method of adding the aqueous dispersion of the invention to nucleating particles in a process of producing the particles (for example, while the raw material for the nucleating particles is ground, or while the nucleating particles are deposited in an aqueous solution). After the treatment, the composite particles may be deposited, taken out through filtration and dried. Through the process, the composite particles are obtained in dry.

The composite particles may be produced in a different. manner. For example, the aqueous dispersion of the invention is dried to obtain the salt of the block copolymer or the polymer composition, and this is blended with:nucleating particles. In order that the nucleating particles can uniformly adsorb the salt of the block copolymer or the polymer composition on their surface, the above-mentioned surface treatment in water is preferred. Mixing the aqueous suspension of particles with the aqueous dispersion of the invention may be effected in various methods. For this, however, preferably used are homomixers, colloid mills, ball mills, sand mills, homogenizers and the like capable of producing shear force.

Organic particles to be the nucleating particles for the composite particles include, for example, wood powder, pulp powder; lakes and toners of azo pigments, azo-lake pigments, condensed azo pigments, anthraquinone, thioindigo, oxazine, quinacridone, acid dyes or basic dyes; copper phthalocyanine and its derivatives, condensed polycyclic pigments and their mixtures and modified derivatives; polymer particles of rayon, vinylon, polyamide, polyamidimide, polyimide, polytetrafluoroethylene, etc. One or more of these may be used herein. Of those, preferred are organic particles having at least one functional group of hydroxyl, amino and carboxyl groups on their surface. When the composite particles are used as a filler for polyolefin resins, the nucleating particles for them are more preferably selected from wood powder, pulp powder, rayon particles and vinylon particles as their ability to improve the mechanical properties of the resins is better.

Inorganic particles to be the nucleating particles for the composite particles include, for example, silicates such as talc, clay, kaolin, mica, etc.; oxides such as silica, titanium oxide, iron oxide, zinc oxide, etc.; hydroxides such as aluminium hydroxide, magnesium hydroxide, etc.; carbonates such as calcium carbonate, magnesium carbonate, etc.; sulfates such as barium sulfate, calcium sulfate, etc.; color pigments such as carbon black, red iron oxide, antimony red, cadmium yellow, cobalt blue, prussian blue, ultramarine, etc. One or more of these may be used herein. Especially preferred are inorganic particles having at least one functional group of hydroxyl, amino and carboxyl groups on their surface. Regarding their morphology, the organic and inorganic particles may be in any form of needles, fibers, powders, etc. When the composite particles are used as a filler for polyolefin resins, the nucleating organic or inorganic particles for them are preferably in the form of needles or fibers as their ability to improve the mechanical properties of the resins is better.

Since the particle size of the matters dispersed therein is small, the aqueous dispersion of the invention has good storage stability, and hardly undergoes phase separation. Therefore, the adhesiveness (especially, the airtight adhesiveness) of the aqueous dispersion of the invention to polyolefin resins, especially to polypropylene is good, and the adhesiveness thereof even to polar substrates is also good. Accordingly, the aqueous dispersion of the invention is useful for primers, coating compositions and adhesives for paint coating and bonding. In addition, it is also useful for coating agents for films, paper, wood, metals, plastics, etc. (for water-proofing agents, lubricants, heat-sealing agents, etc.); primers and anchor-coating agents for paint coating and bonding; modifiers for aqueous coating compositions, aqueous adhesives, aqueous ink, etc. (for pigment dispersion, surface gloss improvement, abrasion resistance, water-proofness, etc.); binders for ink-jet ink, color copies, etc.; toner modifiers; finishing agents; surface-treating agents for metals, etc. The composite particles having adsorbed a salt of the block copolymer are well dispersible in polyolefin. Adding the composite particles to polyolefin improves the physical properties of the polyolefin composition.

The invention is described in detail with reference to the following Examples, which, however, are not intended to restrict the scope of the invention. In the following Examples and Comparative Examples, the samples were analyzed and tested according to the test methods mentioned below, to thereby determine the mean particle size of the particles dispersed, the polymer adsorption on the surface of calcium carbonate, the maximum particle size of calcium carbonate, the surface smoothness of moldings, and the discoloration of moldings. (Measurement of mean particle size)

Using ELS800 (from Otsuka Electronics), each sample is analyzed according to a light-scattering method. (Polymer adsorption on the surface of calcium carbonate) The weight, $W1$, of calcium carbonate having adsorbed a block copolymer and a polyolefin polymer on its surface is measured. Next, the sample is heated at 400° C. for 20 minutes, and its weight, $W2$, after the heat treatment is measured. The polymer adsorption is obtained according to the following formula (1):

$$(1-W2/W1) \times 100 \qquad (1).$$

(Maximum Particle Size of Calcium Carbonate)

The rupture cross-section of the sheet obtained in Examples and Comparative Examples is photographed with a scanning electronic microscope to take its picture enlarged by 100 to 10000 times. The maximum particle size of calcium carbonate seen on the picture is measured. In addition, the presence or absence of agglomerates is checked on the picture.
(Surface Smoothness)

The sheets obtained in Examples and Comparative Examples are macroscopically observed, and evaluated according to the following two-rank criteria:

O: Compared with the surface of the press mold used, the rough surface of the sheet is smaller than 5%.

x: Compared with the surface of the press mold used, the rough surface of the sheet is 5% or more.

(Measurement of Surface Discoloration)

Using a calorimeter Z1001DP (from Nippon Denshoku), the surface color of the sheet obtained in Examples and Comparative Examples is compared with that of a standard white sheet, and the color difference, $\Delta E$, between them is obtained. Samples having a larger $\Delta E$ have a larger color difference from the standard white sheet and are discolored to a higher degree.

REFERENCE EXAMPLE 1

Production of Block Copolymer (I) (polypropylene block/ethyl acrylate-acrylic acid block copolymer)

(1) Polypropylene (Mitsubishi Noblen MH8 from Mitsubishi Chemical) was fed into a double-screw extruder, melted, kneaded and thermally decomposed at 420° C. therein to prepare polypropylene having a double bond at the terminal.

(2) 100 parts by weight of the polypropylene having a double bond at the terminal, obtained in the above (1), 1000 parts by weight of toluene, and 30 parts by weight of thio-S-acetic acid were put into a reactor, which was then well purged with nitrogen, and 10 parts by weight of 2,2'-azobisisobutyronitrile was added thereto. With that, these were reacted at 90° C. for 6 hours to give polypropylene having a thioacetyl group at the terminal.

(3) 60 parts by weight of the polypropylene having a thioacetyl group at the terminal, obtained in the above (2), was dissolved in a mixed solvent of 100 parts by weight of toluene and 20 parts by weight of n-butanol, and 1 part by weight of n-butanol solution of 7% potassium hydroxide was added thereto. In nitrogen, these were reacted for 6 hours at the reflux point of toluene to give polypropylene having a mercapto group at the terminal.

(4) 50 parts by weight of the polypropylene having a mercapto group at the terminal, obtained in the above (3), was dissolved in 500 parts by weight of toluene, to which were added 180 parts by weight of ethyl acrylate and 20 parts by weight of acrylic acid. 1, 1'-Azobis(cyclohexane-1-carbonitrile) was added thereto to such an extent that the polymerization rate of the monomers could be about 10%/hr in nitrogen at 90° C., and the monomers were polymerized in that condition. When the degree of polymerization reached 95%, the reaction was stopped. The reaction mixture was cooled, the solvent was removed from it, and an AB-type diblock copolymer composed of polypropylene blocks (A) and ethyl acrylate-acrylic acid blocks (B) (ethyl acrylate/acrylic acid=90/10 by weight) was obtained. This is hereinafter referred to as block copolymer (I). In the thus-obtained block copolymer (I), the number-average molecular weight of the polymer blocks (A) was 8,200; that of the polymer blocks (B) was 28,000. The number-average molecular weight of the block copolymer (I) was 36,200; and the melting point thereof was 148° C.

REFERENCE EXAMPLE 2

Production of Block Copolymer (II) (polypropylene block/ethyl acrylate-maleic anhydride block copolymer)

50 parts by weight of the polypropylene having a mercapto group at the terminal, obtained in (3) in Reference Example 1, was dissolved in 500 parts by weight of toluene, to which were added 180 parts by weight of ethyl acrylate and 20 parts by weight of maleic anhydride. 1,1'-Azobis (cyclohexane-1-carbonitrile) was added thereto to such an extent that the polymerization rate of the monomers could be about 10%/hr in nitrogen at 90° C., and the monomers were polymerized in that condition. When the degree of polymerization reached 95%, the reaction was stopped. The reaction mixture was cooled, the solvent was removed from it, and an AB-type diblock copolymer composed of polypropylene blocks (A) and ethyl acrylate-maleic anhydride blocks (B) (ethyl acrylate/maleic anhydride=90/10 by weight) was obtained. This is hereinafter referred to as block copolymer (II). In the thus-obtained block copolymer (II), the number-average molecular weight of the polymer blocks (A) was 8,200; that of the polymer blocks (B) was 27,100. The number-average molecular weight of the block copolymer (II) was 35,300; and the melting point thereof was 146° C.

REFERENCE EXAMPLE 3

Production of Block Copolymer (III) (polypropylene-α-olefin block/ethyl acrylate-acrylic acid block copolymer)

(1) 500 g of a propylene-α-olefin copolymer (Tafmer XR110T from Mitsui Chemical) was put into a one-liter reactor, and heated up to 390° C. This was stirred under reduced pressure for 2 hours to obtain a propylene-α-olefin copolymer having a double bound at the terminal. The terminal double bond content of the copolymer was 188.7 μmols/g.

(2) 100 parts by weight of the propylene-α-olefin copolymer having a double bond at the terminal, obtained in the above (1), 300 parts by weight of xylene, and 4.3 parts by weight of thio-S-acetic acid were put into a reactor, which was then well purged with nitrogen, and 0.1 parts by weight of 2,2'-azobisisobutyronitrile was added thereto. With that, these were reacted at 90° C. for 2 hours to give a propylene-α-olefin copolymer having a thioacetyl group at the terminal. The terminal thioacetyl content of the copolymer was 179.2 μmols/g, and the degree of addition reaction was 95%.

(3) 100 Darts by weight of the propylene-α-olefin copolymer having a thioacetyl group at the terminal, obtained in the above (2) was dissolved in a mixed solvent of 120 parts by weight of xylene and 30 parts by weight of n-butanol, and 5.7 parts by weight of n-butanol solution of 4% sodium hydroxide was added thereto. In nitrogen, these were reacted for 1 hour at the reflux point of toluene to give a propylene-α-olefin copolymer having a mercapto group at the terminal. The terminal mercapto content of the copolymer was 175.6 μmols/g, and the degree of reaction was 98%.

(4) 100 parts by weight of the polypropylene having a mercapto group at the terminal, obtained in the above (3), was dissolved in 150 parts by weight of xylene, to which were added 80 parts by weight of ethyl acrylate and 10 parts by weight of acrylic acid. 1,1'-Azobis (cyclohexane-1-carbonitrile) was added thereto to such an extent that the polymerization rate of the monomers could be about 10%/hr in nitrogen at 90° C., and the monomers were polymerized in that condition. When the degree of polymerization reached 95%, the reaction was stopped. The reaction mixture was cooled, the solvent was removed from it, and an AB-type diblock copolymer composed of polypropylene-α-olefin blocks (A) and ethyl acrylate-acrylic acid blocks (B) (ethyl acrylate/acrylic acid=90/10 by weight) was obtained. This is hereinafter referred to as block copolymer (III). In the thus-obtained block copolymer (III), the number-average molecular weight of the polymer blocks (A) was 5,300; that of the polymer blocks (B) was 4,500. The number-average molecular weight of the block copolymer (III) was 9,800; and the melting point thereof was 103° C.

REFERENCE EXAMPLE 4

Production of Carboxyl Group-having Modified Propylene-α-olefin Copolymer (graft copolymer)

300 g of propylene-butene copolymer (having a propylene content of 75 mol %) was fed into a four-neck flask equipped with a stirrer, a condenser and a dropping funnel, and heated and melted therein. Then, this was kept at 180° C., and 25 g of maleic anhydride and 5 g of dicumyl peroxide were dropwise added thereto with stirring over a period of 3 hours. With that, these were reacted for further 3 hours. After the reaction, the resulting reaction product was put into a large amount of acetone to obtain a carboxyl group-having modified propylene-butene copolymer. The copolymer had amelting point of 138° C.

EXAMPLE 1

35 g of the block copolymer (I) obtained in Reference Example 1 and 300 ml of water were put into a 0.5-liter autoclave equipped with a stirrer, and stirred at 160° C. Next, 15 ml of aqueous 10% sodium hydroxide solution was fed into it via a gear pump, over a period of 1 hour. Then, this was stirred for further 30 minutes, and cooled to room temperature to obtain an aqueous dispersion. The particles dispersed in the thus-obtained aqueous dispersion were spherical, and their mean particle size measured was 0.4 μm. After left as it was for 1 week, the aqueous dispersion was stable with no change of particle size.

Next, 500 g of aqueous 7.5 wt. % calcium carbonate dispersion (having a mean particle size of 0.3 μm) and 8.5 g of the aqueous dispersion of the block copolymer (I) obtained in the above were put into a 1.0-liter reactor equipped with a stirrer, and stirred at 70° C. for 2 hours. Then, the resulting slurry was filtered under suction, and the residue was dried in vacuum at 120° C. for 12 hours to obtain calcium carbonate powder having adsorbed the block copolymer (I). 30 g of the resulting calcium carbonate powder and 70 g of polypropylene were kneaded in melt in a roll kneader at 170° C., and then hot-pressed into a sheet in a press mold having a mirror surface of a stainless plate. The surface smoothness of the sheet, the degree of discoloration thereof, and the maximum grain size of the calcium carbonate particles therein are given in Table 1. From the data, it is understood that the dispersibility in polypropylene of calcium carbonate having adsorbed the block copolymer (I) is excellent.

EXAMPLE 2

35 g of the block copolymer (II) obtained in Reference Example2 and 300 ml of water were put in to a 0.5-liter autoclave equipped with a stirrer, and stirred at 160° C. Next, 15 ml of aqueous 10% sodium hydroxide solution was fed into it via a gear pump, over a period of 1 hour. Then, this was stirred for further 30 minutes, and cooled to room temperature to obtain an aqueous dispersion. The particles dispersed in the thus-obtained aqueous dispersion were spherical, and their mean particle size measured was 0.35 μm. After left as it was for 1 week, the aqueous dispersion was stable with no change of particle size.

Next, 500 g of aqueous 7.5 wt. % calcium carbonate dispersion (having a mean particle size of 0.3 μm) and 8.5 g of the aqueous dispersion of the block copolymer (II) obtained in the above were put into a 1.0-liter reactor equipped with a stirrer, and stirred at 70° C. for 2 hours. Then, the resulting slurry was filtered under suction, and the residue was dried in vacuum at 120° C. for 12 hours to obtain calcium carbonate powder having adsorbed the block copolymer (II). 30 g of the resulting calcium carbonate powder and 70 g of polypropylene were kneaded in melt in a roll kneader at 170° C., and then hot-pressed into a sheet in a press mold having a mirror surface of a stainless plate. The surface smoothness of the sheet, the degree of discoloration thereof, and the maximum grain size of the calcium carbonate particles therein are given in Table 1. From the data, it is understood that the dispersibility in polypropylene of calcium carbonate having adsorbed the block copolymer (IIY is excellent.

EXAMPLE 3

15 g of polypropylene having a limiting viscosity of 0.12 dl/g, a density of 0.89 g/cm³ and a melting point of 144° C., and 35 g of the block copolymer (I) obtained in Reference Example 1 and 300 ml of water were put into a 0.5-liter autoclave equipped with a stirrer, and stirred at 160° C. Next, 15 ml of aqueous 10% sodium hydroxide solution was fed into it via a gear pump, over a period of 1 hour. Then, this was stirred for further 30 minutes, and cooled to room temperature to obtain an aqueous dispersion. The particles dispersed in the thus-obtained aqueous dispersion were spherical, and their mean particle size measured was 0.55 μm. After left as it was for 1 week, the aqueous dispersion was stable with no change of particle size.

Next, 500 g of aqueous 7.5 wt. % calcium carbonate dispersion (having a mean particle size of 0.3 μm) and 8.5 g of the aqueous dispersion of the block copolymer (I) and polypropylene obtained in the above were put into a 1.0-liter reactor equipped with a stirrer, and stirred at 70° C. for 2 hours.

Then, the resulting slurry was filtered under suction, and the residue was dried in vacuum at 120° C. for 12 hours to obtain calcium carbonate powder having adsorbed the block copolymer (I) and polypropylene. 30 g of the resulting calcium carbonate powder and 70 g of polypropylene were kneaded in melt in a roll kneader at 170° C., and then hot-pressed into a sheet in a press mold having a mirror surface of a stainless plate. The surface smoothness of the sheet, the degree of discoloration thereof, and the maximum grain size of the calcium carbonate particles therein are given in Table 1. From the data, it is understood that the dispersibility in polypropylene of calcium carbonate having adsorbed the block copolymer (I) and polypropylene is excellent.

EXAMPLE 4

50 g of the block copolymer (III) obtained in Reference Example 3 and 250 g of xylene were put into a 0.5-liter reactor equipped with a stirrer and a condenser, and dissolved at 100° C. Next, 300 g of aqueous 1% sodium hydroxide solution was fed into it via a dropping funnel over a period of 1 hour to obtain a xylene-water suspension. Xylene was evaporated away from the suspension to obtain a crude emulsion. 300 g of the crude emulsion (having a resin content of 50 g) was put into an autoclave, and stirred at 160° C. for 1 hour. After having been thus stirred, this was cooled to room temperature to obtain an aqueous dispersion. The particles dispersed in the thus-obtained aqueous dispersion were spherical, and their mean particle size measured was 0.3 μm. After left as it was for 1 week, the aqueous dispersion was stable with no change of particle size.

Next, 500 g of aqueous 7.5 wt. % calcium carbonate dispersion (having a mean particle size of 0.3 μm) and 8.5 g of the aqueous dispersion of the block copolymer (III) obtained in the above were put into a 1.0-liter reactor equipped with a stirrer, and stirred at 70° C. for 2 hours. Then, the resulting slurry was filtered under suction, and the residue was dried in vacuum at 120° C. for 12 hours to obtain calcium carbonate powder having adsorbed the block copolymer (III) 30 g of the resulting calcium carbonate powder and 70 g of polypropylene were kneaded in melt in a roll kneader at 170° C., and then hot-pressed into a sheet in a press mold having a mirror surface of a stainless plate. The surface smoothness of the sheet, the degree of discoloration thereof, and the maximum grain size of the calcium carbonate particles therein are given in Table 1. From the data, it is understood that the dispersibility in polypropylene of calcium carbonate having adsorbed the block copolymer (III) is excellent.

COMPARATIVE EXAMPLE 1

500 g of aqueous slurry of 7.5 wt. % calcium carbonate (having a mean particle size of 0.3 μm) was filtered under suction, and the residue was dried in vacuum at 120° C. for 12 hours to obtain calcium carbonate powder. 30 g of the resulting calcium carbonate powder and 70 g of polypropylene were kneaded in melt in a roll kneader at 170° C., and then hot-pressed into a sheet in a press mold having a mirror surface of a stainless plate. The surface smoothness of the sheet, the degree of discoloration thereof, and the maximum grain size of the calcium carbonate particles therein are given in Table 1. Calcium carbonate agglomerates were seen in the rupture cross-section of the sheet. From the data, it is understood that the dispersibility in polypropylene of non-processed calcium carbonate is poor.

COMPARATIVE 2

100 g of the modified propylene-α-olefin copolymer (graft copolymer) obtained in Reference Example 3 was put into a 1-liter flask equipped with a stirrer, then heated and melted. 12 g of a nonionic surfactant, Nonion NS-212 (trade name by NOF) was added to it, and then ethanolamine (0.7 equivalents) was thereto. The resulting composition was kept at 100° C., and 300 g of water at 90° C. was added thereto little by little with strongly stirring it to obtain a milky aqueous dispersion. The particles in the resulting aqueous dispersion was spherical, and their mean particle size measured was 0.32 μm. After left as it was for 1 week, the aqueous dispersion was stable with no change of particle size.

Next, 500 g of aqueous 7.5 wt. % calcium carbonate dispersion (having a mean particle size of 0.3 μm) and 8.5 g of the aqueous dispersion of the modified propylene-α-olefin copolymer obtained in the above were put into a 1.0-liter reactor equipped with a stirrer, and stirred at 70° C. for 2 hours.

Then, the resulting slurry was filtered under suction, and the residue was dried in vacuum at 120° C. for 12 hours to obtain calcium carbonate powder having adsorbed the modified propylene-α-olefin copolymer. 30 g of the resulting calcium carbonate powder and 70 g of polypropylene were kneaded in melt in a roll kneader at 170° C., and then hot-pressed into a sheet in a press mold having a mirror surface of a stainless plate. The surface smoothness of the sheet, the degree of discoloration thereof, and the maximum grain size of the calcium carbonate particles therein are given in Table 1. Calcium carbonate agglomerates were seen in the rupture cross-section of the sheet. From the data, it is understood that the dispersibility in polypropylene of calcium carbonate having adsorbed the graft copolymer is poor.

TABLE 1

|  | Example 1 | Example 2 | Example 3 | Example 4 | Comp. Ex. 1 | Comp. Ex. 2 |
|---|---|---|---|---|---|---|
| Adsorbed Polymer[1] | BP1 | BP2 | BP1 + PP | BP3 | — | GP |
| Polymer Adsorption | 1.7% | 1.8% | 1.7% | 1.5% | — | 1.6% |
| Maximum Particle Size of Calcium Carbonate (μm) | 1.2 | 0.9 | 1.3 | 0.8 | 120[2] | 80[2] |
| Surface Smoothness | ○ | ○ | ○ | ○ | x | x |
| Color Difference (ΔE) | 6.1 | 7.6 | 5.9 | 5.6 | 21.6 | 17.8 |

[1]BP1: Block copolymer (I)
BP2: Block copolymer (II)
BP3: Block copolymer (III)
GP: Graft copolymer
PP: Polypropylene
[2]Calcium carbonate formed agglomerates.

INDUSTRIAL APPLICABILITY

The invention provides an aqueous dispersion having good adhesiveness, especially airtight adhesiveness to various substrates, and having good storage stability, good weather resistance and good hydrophobicity, and provides a method for producing it.

What is claimed is:

1. An aqueous dispersion of a block copolymer composed of polymer blocks (A) consisting essentially of olefin monomer units and polymer blocks (B) comprising from 2 to 100 mol % of units of vinyl monomers having a carboxyl group or a carboxylic acid anhydride group and from 0 to 98 mol % of units of other vinyl comonomers capable of copolymerizing with the vinyl monomers, dispersed in an aqueous solution of at least 0.05 equivalents, relative to the carboxyl group or the carboxylic acid anhydride group, of a basic substance.

2. The aqueous dispersion as claimed in claim 1, wherein the mean particle size of the matters dispersed falls between 0.05 and 2 μm.

3. The aqueous dispersion as claimed in claim 1, wherein the polymer blocks (B) comprise from 2 to 50 mol % of units of vinyl monomers having a carboxyl group or a carboxylic acid anhydride group and from 50 to 98 mol % of units of other vinyl comonomers capable of copolymerizing with the vinyl monomers.

4. The aqueous dispersion as claimed in claim 1, wherein the olefin monomer units in the polymer blocks (A) are units derived from propylene, or units derived propylene and units derived from other α-olefins than propylene.

5. The aqueous dispersion as claimed in claim 1, wherein the number-average molecular weight of the polymer blocks (A) falls between 1,000 and 100,000, and the number-average molecular weight of the polymer blocks (B) falls between 1,000 and 100,000.

6. A method for producing an aqueous dispersion by dispersing a block copolymer composed of polymer blocks (A) consisting essentially of olefin monomer units and polymer blocks (B) comprising from 2 to 100 mol % of units of vinyl monomers having a carboxyl group or a carboxylic acid anhydride group and from 0 to 98 mol % of units of other vinyl comonomers capable of copolymerizing with the vinyl monomers, in an aqueous solution of at least 0.05 equivalents, relative to the carboxyl group or the carboxylic acid anhydride group, of a basic substance, at a temperature not lower than the melting point of the block copolymer.

7. A method for producing an aqueous dispersion by dispersing 100 parts by weight of a block copolymer composed of polymer blocks (A) consisting essentially of olefin monomer units and polymer blocks (B) comprising from 2 to 100 mol % of units of vinyl monomers having a carboxyl group or a carboxylic acid anhydride group and from 0 to 98 mol % of units of other vinyl comonomers capable of copolymerizing with the vinyl monomers and from 1 to 200 parts by weight of an olefin polymer, in an aqueous solution of at least 0.05 equivalents, relative to the carboxyl group or the carboxylic acid anhydride group, of a basic substance, at a temperature not lower than the melting point of either one of the two, block copolymer and olefin polymer, having a higher melting point.

8. Particles having adsorbed a salt of a block copolymer composed of polymer blocks (A) consisting essentially of olefin monomer units and polymer blocks (B) comprising from 2 to 100 mol % of units of vinyl monomers having a carboxyl group or a carboxylic acid anhydride group and from 0 to 98 mol % of units of other vinyl comonomers capable of copolymerizing with the vinyl monomers.

9. Particles having adsorbed 100 parts by weight of a salt of a block copolymer composed of polymer blocks (A) consisting essentially of olefin monomer units and polymer blocks (B) comprising from 2 to 100 mol % of units of vinyl monomers having a carboxyl group or a carboxylic acid anhydride group and from 0 to 98 mol % of units of other vinyl comonomers capable of copolymerizing with the vinyl monomers and from 1 to 200 parts by weight of an olefin polymer.

10. The aqueous dispersion as claimed in claim 2, wherein the polymer blocks (B) comprise from 2 to 50 mol % of units of vinyl monomers having a carboxyl group or a carboxylic acid anhydride group and from 50 to 98 mol % of units of other vinyl comonomers capable of copolymerizing with the vinyl monomers.

11. The aqueous dispersion as claimed in claim 2, wherein the olefin monomer units in the polymer blocks (A) are units derived from propylene, or units derived propylene and units derived from other α-olefins than propylene.

12. The aqueous dispersion as claimed in claim 3, wherein the olefin monomer units in the polymer blocks (A) are units derived from propylene, or units derived propylene and units derived from other α-olefins than propylene.

13. The aqueous dispersion as claimed in claim 10, wherein the olefin monomer units in the polymer blocks (A) are units derived from propylene, or units derived propylene and units derived from other α-olefins than propylene.

14. The aqueous dispersion as claimed in claim 2, wherein the number-average molecular weight of the polymer blocks (A) falls between 1,000 and 100,000, and the number-average molecular weight of the polymer blocks (B) falls between 1,000 and 100,000.

15. The aqueous dispersion as claimed in claim 3, wherein the number-average molecular weight of the polymer blocks (A) falls between 1,000 and 100,000, and the number-average molecular weight of the polymer blocks (B) falls between 1,000 and 100,000.

16. The aqueous dispersion as claimed in claim 10, wherein the number-average molecular weight of the polymer blocks (A) falls between 1,000 and 100,000, and the number-average molecular weight of the polymer blocks (B) falls between 1,000 and 100,000.

17. The aqueous dispersion as claimed in claim 4, wherein the number-average molecular weight of the polymer blocks (A) falls between 1,000 and 100,000, and the number-average molecular weight of the polymer blocks (B) falls between 1,000 and 100,000.

18. The aqueous dispersion as claimed in claim 11, wherein the number-average molecular weight of the polymer blocks (A) falls between 1,000 and 100,000, and the number-average molecular weight of the polymer blocks (B) falls between 1,000 and 100,000.

19. The aqueous dispersion as claimed in claim 12, wherein the number-average molecular weight of the polymer blocks (A) falls between 1,000 and 100,000, and the number-average molecular weight of the polymer blocks (B) falls between 1,000 and 100,000.

20. The aqueous dispersion as claimed in claim 13, wherein the number-average molecular weight of the polymer blocks (A) falls between 1,000 and 100,000, and the number-average molecular weight of the polymer blocks (B) falls between 1,000 and 100,000.

21. The aqueous dispersion as claimed in any one of claims 1 to 5 and 10–20, which contains from 1 to 200 parts by weight of an olefin polymer relative to 100 parts by weight of the block copolymer.

* * * * *